(12) United States Patent
Takagi et al.

(10) Patent No.: US 6,385,502 B1
(45) Date of Patent: May 7, 2002

(54) RACE GROOVE MACHINING SYSTEM AND METHOD THEREFOR

(75) Inventors: Shigeyoshi Takagi; Takahiro Nakano, both of Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/280,003

(22) Filed: Mar. 29, 1999

(30) Foreign Application Priority Data

Mar. 31, 1998 (JP) .......................................... 10-085541
Mar. 31, 1998 (JP) .......................................... 10-085542

(51) Int. Cl.[7] ............................................. G06F 19/00
(52) U.S. Cl. ................. 700/169; 700/9; 700/3
(58) Field of Search ................ 700/169, 9, 3, 700/7, 20, 173

(56) References Cited

U.S. PATENT DOCUMENTS

| | | | | |
|---|---|---|---|---|
| 4,281,379 A | * | 7/1981 | Austin | 700/3 |
| RE31,247 E | * | 5/1983 | Johnstone | 700/177 |
| 4,550,375 A | * | 10/1985 | Sato et al. | 700/169 |
| 4,827,395 A | * | 5/1989 | Anders et al. | 700/9 |
| 5,012,402 A | * | 4/1991 | Akiyama | 700/87 |
| 5,224,051 A | * | 6/1993 | Johnson | 700/169 |
| 5,252,899 A | * | 10/1993 | Kawamura et al. | 318/568.1 |
| 5,266,878 A | * | 11/1993 | Makino et al. | 318/571 |
| 5,757,648 A | * | 5/1998 | Nakamura | 700/169 |

* cited by examiner

*Primary Examiner*—Paul P. Gordon
*Assistant Examiner*—Edward F. Gain, Jr.
(74) *Attorney, Agent, or Firm*—Sughrue Mion, PLLC (57) ABSTRACT

A system for machining a component part having a race groove a along which ball elements run include a machine tool 3 for performing a machining operation on the component part, an acquisition unit 8 for acquiring information related to the machining operation, a control unit 4 for controlling the machine tool 3 based on the information acquired by the acquisition unit 8, a remote information processor 10 installed at a site remote from the control unit 4, and a communication system 9 for connecting the control unit 4 and the remote information processor 10 through a communication line 12. The remote information processor 10 has a capability of acquiring the information, acquired by the acquisition unit 8, through the control unit 4 and the communication line 12 and transmitting such information to the control unit 4 so that the component part can be machined to suit to a particular machining condition while satisfying a stabilized dimension.

17 Claims, 6 Drawing Sheets

RACE GROOVE MACHINING SYSTEM AND METHOD THEREFOR

BACKGROUND OF THE INVENTION

1. Field of the Invention

The present invention relates to a race groove machining system such as, for example, a grinding machine or a lather turning machine for machining a component parts of a rolling bearing or a constant velocity flexible coupling to form a race groove therein, and also to a machining method therefor.

2. Description of the Prior Art

Since in a rolling bearing or a constant velocity flexible coupling a plurality of steel balls runs in a race groove formed in any of the component parts, that is, outer and inner races, an extremely high precision is required. For this reason, in the event of occurrence of any deviation in size from the design size and/or a defective grinding result, a in-site monitoring of the machining apparatus and/or inspection of the products have hitherto been carried out to provide a result of monitoring and/or inspection according to which the machining apparatus in trouble have been adjusted.

However, as far as this type of the component parts are concerned, machining conditions are many and mingled to complexity. By way of example the machining conditions such as rotational speed of the main shaft, machining feed rate, machining feed speed, dressing conditions, and dressing compensation amount are involved together. For this reason, it is extremely difficult for an attendant worker or operator to make a proper decision and then to perform a remedy according to the result of monitoring and inspection. Depending on the result of monitoring and inspection, an expert technician employed by the manufacturer of the machining system tends to be called to visit in the site and perform a diagnose the operating status of the machining system so that he or she can perform adjustment of control devices, requiring a time-consuming and laborious job.

As regards the maintenance, the conventional machining apparatus have been examined at the site of installation thereof as to any possible change in operating condition with time and, should the necessity arise, component parts are replaced at such site, thus requiring a time-consuming and laborious job.

To keep the machining apparatus in a condition to achieve a precision and a performance, accumulation of histories of machining data in the past for each of devices of the machining system is required. However, where means for accumulating the machining data and for analyzing and managing those accumulated machining data are installed for each of the machining devices, the equipment cost would become high and the efficiency of use of the equipments would be low.

On the other hand, in the manufacture of the bearing and the constant velocity flexible coupling, production of a large amount of component parts is necessary and therefore it is often that a number of machining devices of the same type are installed and operated under the same machining condition. In such case, although the same or similar adjustment is required for all of the machining devices, the current practice is that for each of the machining device, individual adjustments are carried out, resulting in reduction in efficiency of adjusting works.

SUMMARY OF THE INVENTION

Accordingly, the present invention has been devised with a view to substantially eliminating the above discussed problems inherent in the prior art machining apparatus and is intended to provide an improved race groove machining system in which signals detected in machining devices at different remote sites are monitored to grasp the status of machining so that a remote control can be achieved to perform a proper adjustment and setting to thereby allow the component part to be manufactured precisely with a stabilized dimension.

Another important object of the present invention is to provide a race groove machining method of the kind utilized in the race groove machining system of the type referred to above.

In order to accomplish the objects of the present invention, there is provided a system for machining a component part having a race groove along which ball elements run, said system comprising a machine tool for performing a machining operation on the component part, an acquisition means for acquiring information related to the machining operation, a control means for controlling the machine tool based on the information acquired by the acquisition means, a remote information processing means installed at a site remote from the control means, and a communication means for connecting the control means and the remote information processing means through a communication line. The remote information processing means has a capability of acquiring the information, acquired by the acquisition means, through the control means and the communication line and transmitting the information to the control means. The acquisition means may comprise sensors or any means capable of reading information stored in a predetermined storage device.

In this machining system, the machine tool performs a machining operation on the component part under the control of the control means. During the machining or at any desired time, the acquisition means acquires information related to the machining operation. The acquired information is transmitted to the remote information processing means through the control means and the communication line. The information processing means operates to cause the acquired and transmitted information to be displayed on a display screen and to perform a predetermined processing on such information which is subsequently supplied to the control means. In response to the supplied information, the control means controls the machine tool.

Accordingly, a proper countermeasure to bring the machine tool in a proper operating condition can conveniently be taken by allowing the remote information processing means at a remote site to monitor the information acquired by the acquisition means, causing the dispatched expert technician or the computer to grasp and diagnose the operating condition of the machine tool based on the acquired information and to generate information necessary to change values preset in the control means according to the result of diagnosis, and transmitting the generated information from the information processing means to the control means.

The race groove machining system of the present invention may further comprise an additional information processing means intervening between the control means and the communication means and independent from the remote information processing means. In this case, the remote information processing means interrogates the information with the control means through the additional information processing means.

Preferably, the information related to the machining operation may include machining conditions stored in a machining condition storage device, in which case the acquisition means has its acquiring capability of reading the information stored in the machining condition storage device.

Also preferably, the information related to the machining operation may include a product information, which is information descriptive of a product shape and an precision, stored in a product information storage device, in which case the acquisition means has its acquiring capability of reading the product information stored in the product information storage device. The term "product" referred to here means a product obtained as a result of the race groove machining system performing the machining operation on the component part.

The information related to the machining operation may preferably include information descriptive of a machining status, and the acquisition means may include a machining detecting means comprised of a plurality of sensors for detecting statuses of the machining operation.

The present invention also provides a method of machining a component part having a race groove along which ball elements run, said method comprising the steps of transmitting information related to a machining operation and acquired from an acquisition means that is provided in a machine tool or a control means for controlling the machine tool, to a remote information processing means remote from the control means through a communication line, supplying to the control means information generated by the remote information processing means on the basis of the transmitted information, controlling the machine tool by means of the control means that utilizes the supplied information; and machining the component part by means of the machine tool to form a race groove in the component part. It is to be noted that the information generated by the remote information processing means may be that inputted by an operator of the system.

According to another aspect of the present invention, there is provided a system for machining a component part having a race groove along which ball elements run, said system comprising, a machine tool for performing a machining operation on the component part, a control means for controlling the machine tool, an acquisition means for acquiring information related to the machining operation, a setting means for setting reference machining conditions, a calculating means for calculating a difference between the reference machining conditions and the information acquired by the acquisition means, a feed-back means for supplying a result of calculation, performed by the calculating means, to the control means as feed-back information, a remote information processing means installed at a site remote from the control means, and a communication means for connecting both the control means and the setting means with the remote information processing means through a communication line. The control means utilizes the feed-back information for the control. The remote information processing means has a capability of acquiring the feed-back information through the control means and the communication line and transmitting information to the control means and the setting means. The acquisition means may comprise sensors provided in the machine tool or any means capable of reading information stored in a predetermined storage device which forms a part of the control means.

In this machining system according to the alternative embodiment, during the machining or at any desired time, the acquisition means acquires information related to the machining operation. The calculating means calculates the difference between the acquired information and the reference machining conditions set in the setting means, which difference is subsequently supplied as feed-back information to the control means. The control means makes use of this feed-back information for controlling the machine tool and also supply it to the remote information processing means through the communication means and the communication line. The information processing means operates to cause the supplied information to be displayed on a display screen and to perform a predetermined processing on such information which is subsequently supplied to the control means and the setting means. The setting means updates the contents set therein according to the information transmitted from the remote information processing means. Thereafter, the updated content in the setting means is compared with the content acquired by the acquisition means.

Accordingly, even with this alternative system a proper countermeasure to bring the machine tool in a proper operating condition can conveniently be taken by allowing the remote information processing means at a remote site to monitor the information acquired by the acquisition means, causing the dispatched expert technician or the computer to grasp and diagnose the operating condition of the machine tool based on the acquired information and to generate information necessary to change values preset in the control means according to the result of diagnosis, and transmitting the generated information from the information processing means to the setting means and the control means.

The race groove machining system according to the alternative embodiment may also further comprise a machine-side information processing means intervening between both of the control means and the setting means and the communication means and independent from the remote information processing means. In this case, the remote information processing means interrogates the information with the control means and the setting means through the machine-side information processing means.

Preferably, the reference machining conditions and the information related to the machining operation, acquired by the acquisition means, may include machining conditions.

Also preferably, the reference machining conditions and the information related to the machining operation, acquired by the acquisition means, may include a product information descriptive of the shape of the product and the precision thereof The term "product" referred to here means a product obtained as a result of the race groove machining system performing the machining operation on the component part.

The present invention also provides an alternative method of machining a component part having a race groove along which ball elements run, with the use of a machine tool under the control of a control means. This alternative method comprises the steps of setting reference machining conditions in a setting means, acquiring information related to a machining operation from the machine tool and the control means by an acquisition means, calculating a difference between the reference machining condition, set in the setting means, and the information acquired by the acquisition means, by means of a calculating means, supplying a result of calculation, performed by the calculating means, to the control means as feed-back information, said control means utilizing the feed-back information for the control and to transmit the feed-back information to a remote information processing means that is installed at a site remote from the control means and connected with the control means through a communication line, supplying to the control means and the setting means information generated by the remote information processing means on the basis of the transmitted information, controlling the machine tool by means of the control means that utilizes the supplied information, and updating contents of the reference processing conditions set in the setting means. It is to be noted that the information generated by the remote information processing means may be that inputted by an operator of the system.

In any event, the component part may be that of a bearing or a constant velocity flexible coupling, and the machine tool may be either a grinding machine or a lather turning machine.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
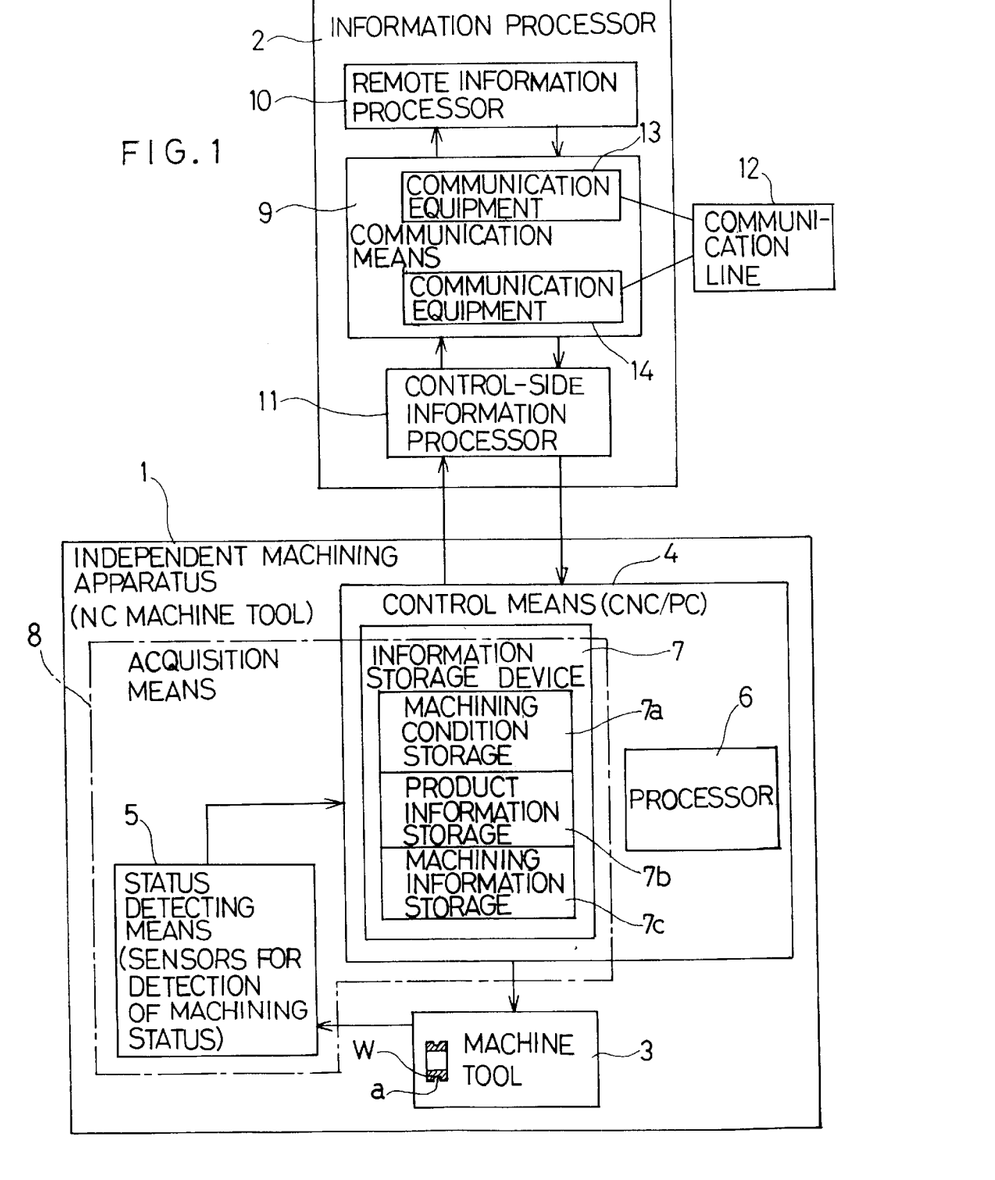
FIG. 1 is a block diagram showing a schematic structure of a race groove machining system according to a first preferred embodiment of the present invention.

A first preferred embodiment of the present invention will be described with reference to FIGS. 1 to 3. Referring first to FIG. 1, there is shown a block diagram of a race groove machining system according to the first embodiment of the present invention. The race groove machining system shown therein generally comprises an independent machining apparatus 1 and an information processing apparatus 2. The independent machining apparatus 1 includes mainly a machine tool 3 and a control means 4 for controlling the machine tool 3 and may be a numerically controlled machine tool (NC machine tool). The independent machining apparatus 1 also includes a status detecting means 5 for detecting information descriptive of the status of machining performed by the machine tool 3. As will become clear from the subsequent description, the status detecting means 5 forms a part of an acquisition means 8.

The machine tool 3 is one of component part of the independent machining apparatus 1 which performs machining on a work W and may be a machine tool such as, for example, a grinding machine or a lather turning machine. The machine tool 3 may be of a type including a loader for supplying and delivering works W successively. The work W employed in the practice of the present invention is a race having at least one circumferentially extending race groove a along which balls such as, for example, steel balls rollingly move and may be an inner or outer race of a rolling bearing, an inner or outer race of a constant velocity flexible coupling or a screw shaft or nut of a ball screw.

The control means 4 comprises, for example, a computer-assisted numerically controlled machine (CNC machine), a programmable controller (PC device) and a control panel (not shown) therefor. This control means 4 includes an information storage device 7 for storing various preset information and detected information both necessitated for particular machining operations and a processing device 6 for executing a selected one of the particular machining operations according to contents stored in the information storage unit 7 and a machining program The information storage unit 7 in turn includes a machining condition storage unit 7a in which various machining conditions such as, for example, the rotational speed of a main shaft, a dressing condition for a grindstone in the case of a grinding machine, the rotational speed, feed speed and feed rate of a tool are stored, a product information storage unit 7b in which conditions of a product (product conditions) processed from the work W which are a component part to be machined, such as, for example, product identification, weight and groove dimensions are stored, and a machining information storage unit 7c in which information necessary to supervise the machining process such as, for example, machining power, dimensions of the product being machined, machining temperature and machining time are stored.

The status detecting means 5 is a term used to collectively denote various sensors used to detect information concerning machining conditions at various localities in the machine tool 3. Detected pieces of information detected by and outputted from the status detecting means 5 are stored in the machining information storage unit 7c.

The acquisition means 8 collectively includes both a means for reading contents stored in the machining condition storage unit 7a, the product information storage unit 7b and the machining information storage unit 7c, and the status detecting means 5.

The information processing apparatus 2 comprises an adjacent information processing means 11 installed adjacent the control means 4 of the independent machining apparatus 1, and a remote information processing means installed at a site distant from, but connected with the information processing means 11 through a communication means 9. Each of the information processing means 10 and 11 is employed in the form of a computer or the like and has a communication capability implemented by a communication software program. The communication means 9 is a bidirectional communication means for performing a bidirectional transmission of information between the information processing means 10 and 11 through a communication line 12 and includes an adjacent communication equipment 14 adjacent the control means 4 and a remote communication equipment 13 installed at the distant site. The communication line 12 may be a public communication line such as a public telephone network, or a leased communication line and may be either an analog communication line or a digital communication line. Where the analog communication line is used for the communication line 12, the communication equipments 13 and 14 should include a modem, but where the digital communication line is used for the communication line 12, they should include a DSU (digital service unit) or a TA (terminal adapter).

The information processing means 11 adjacent the control means 4 is a means for performing a process necessary to transmit and receive information to and from the remote information processing means 10 distant from the control means 4 and may be employed in the form of a personal computer or the like.

The remote information processing means 10 has a capability of displaying information, transmitted from the acquisition means 8 through the information processing means 11 adjacent the control means 4, on a display screen in a predetermined format, an also a capability of transmitting information, which is appropriately inputted or prepared by the information processing means 10 and which concerns change of settings of the control means 4, through the communication means 9 to the information processing means 11 adjacent the control means 4. It is desirable that the remote information processing means 10 additionally has a capability of accumulating, analyzing and managing information transmitted from the acquisition means 8 thereto through the information processing means 11 adjacent the control means 4, in a predetermined format. Also, this information processing means 10 may be of a design in which a plurality of computers are connected with buses and communication lines so that those computers may have their respective capabilities of accumulating, analyzing and managing the information.

The remote information processing means 10 and the information processing means 11 adjacent the control means 4 may be connected either one to many or many to many. Also, the information processing means 11 adjacent the control means 4 may be one of computers connected through a local area network within the premises of a factory and/or the remote information processing means 10 may also be one of computers connected through a local area network within the premises of a different factory. Communication between those information processing means 10 and 11 may be carried out through the Internet based on the TCP/IP protocol utilizing a web site server or directly through other communication media.

Figure 2:
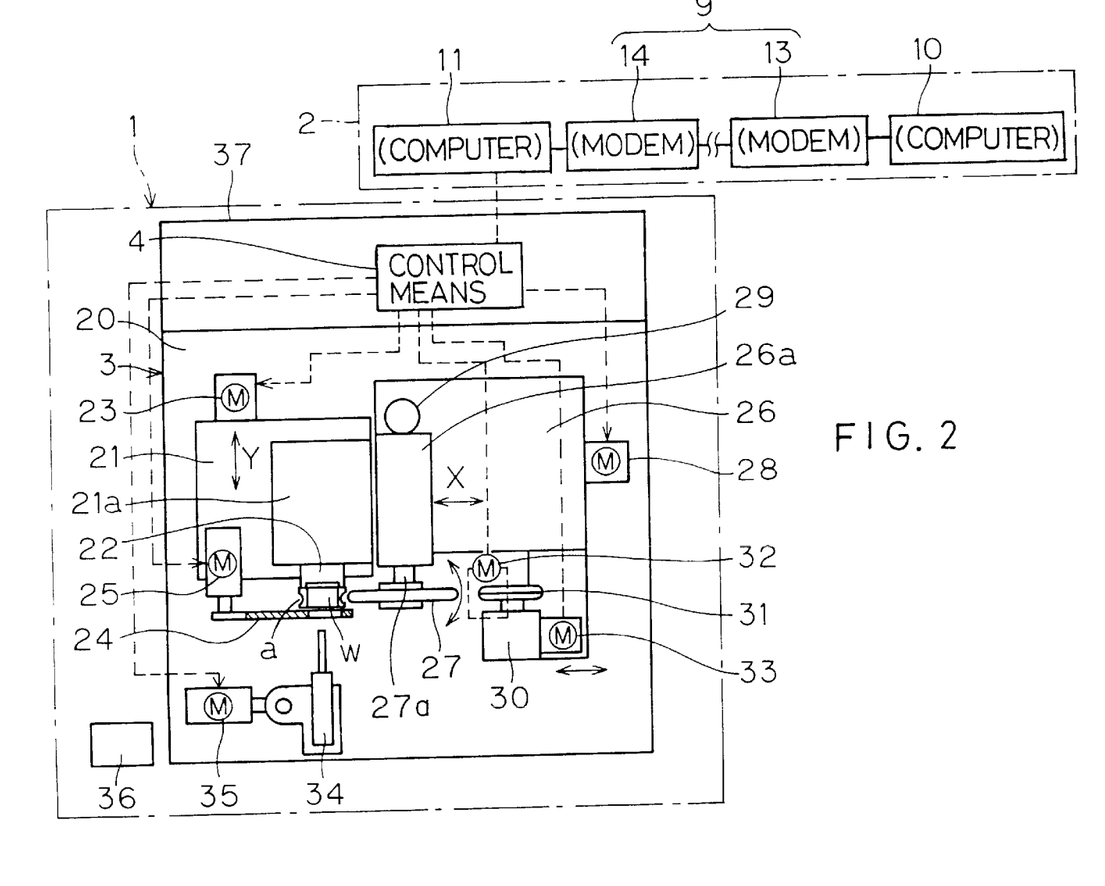
FIG. 2 is a diagram showing a schematic plan view of a machine tool of the race groove machining system together with its block diagram.

FIG. 2 is a diagram illustrating a block circuit of the machining system together with a schematic plan view of the independent machining apparatus 1. The machine tool 3 comprises a grinding machine for grinding the work W, which is a component part to be machined, to form a race groove a on an outer peripheral surface of the work. The work W in the illustrated embodiment is an inner race for a rolling bearing as will be described later with reference to FIG. 3. The machine tool 3 comprising the grinding machine includes a main shaft 22 for holding and rotating the work W, a rotary grindstone, a dressing device 30 and a loader 24.

The main shaft 22 is rotatably mounted on a main shaft bearing 21a of a main shaft support structure 21. The main shaft support structure 21 is in turn mounted on a machine base 20, which is a grinder body, for movement in a direction (Y-axis direction) axially of the main shaft 22 between advanced and retracted positions and is driven by a main shaft control motor 23. Axial movement of the main shaft 22 incident to the movement of the main shaft support structure 21 is effective to compensate for a misalignment between the race groove a in the work W and the rotary grindstone 27. Holding of the work W by the main shaft 22 is carried out by means of an electromagnetic main shaft chuck. Rotation of the main shaft 22 is carried out by means of a spindle motor (not shown) mounted on the main shaft support structure 21.

The loader 24 for delivering the work W, which has not yet been machined, onto the main shaft 22 and removing it from the main shaft 22 after the work W has been machined, is mounted on, or positioned at a location adjacent, the main shaft support structure 21. This loader 24 is driven by a loader control motor 25.

The machine base 20 has a grindstone support base 26 mounted thereon for movement between advanced and retracted positions in a direction (X-axis direction) perpendicular to the main shaft 22, and a grindstone support shaft 27a of the rotary grindstone 27 which is a tool used to grind the race groove a is rotatably mounted on a grindstone shaft bearing 26a of the grindstone support base 26. The grindstone support base 26 is driven by a grindstone support control motor 28 between the advanced and retracted positions. The rotary grindstone 27 is rotated at a high speed by a grindstone drive motor (not shown) mounted on the grindstone support base 26. The machining power exerted by this grindstone drive motor is detected by a power detector 29. The power detector 29 may be employed in the form of a detector for detecting an electric power value of the grindstone drive motor or an AE sensor.

The dressing device 30 is a device for dressing the rotary grindstone 27 which comprises a dressing tool 31, a dresser swiveling motor 32 and a dressing correction motor 33. The dressing tool 31 makes use of diamond or the like. The dresser swivel motor 32 is operable to turn a dressing tool unit, comprises of the dressing tool 31 and a support frame therefor, in respective directions opposite to each other along a substantially arcuate path following a cross-section of the rotary grindstone 27. By turning the dressing tool unit along the arcuate path while the dressing tool 31 is rotated, the rotary grindstone 27 can be dressed. The dressing correction motor 33 is a drive motor for driving the dressing tool 31 between advanced and retracted positions for correcting the relationship in position between the dressing tool 31 and the rotary grindstone 27 which has been dressed by the dressing tool 31.

A gauge device 34 is a device operable to measure the dimensions of the race groove a in the work W retained by the main shaft 22 at any time before, during and after the machining operation and is disposed in face-to-face relation with a shaft end of the main shaft 22. This gauge device 34 is adapted to be swivelled by a gauge swivel motor 35 between measuring and stand-by positions.

A degaussing unit 36 is disposed inside or outside the machine tool 3 and is operable to neutralize the magnetic field developed in the work W chucked by an electromagnetic force during the machining operation.

A controller 37 is disposed adjacent the machine tool 3, and a portion or the whole of the controller 37 forms the control means 4 comprised of the previously described CNC machine.

The gauge device 34 and the power detector 29 form respective parts of the status detecting means 5 shown in FIG. 1.

The information processing apparatus 2 makes use of a computer for each of the information processing means 10 and 11 at the distant site and adjacent the grinding machine, respectively, and the communication means 9 makes use of a modem 13 and 14 for each of the communication equipments 13 and 14 at the distant site and adjacent the grinding machine.

The information processing means 11 adjacent the grinding machine has a capability of transmitting and receiving information such as the machining conditions, the product information and the machining status to and from the control means 4, respectively, and supervising such information.

The remote information processing means 10 can perform accumulation, analysis and management, all at one time, of machining data utilized by the machining apparatus 1 and also generation of maintenance instructions by monitoring a history of operating statuses of the machine tool 3.

Figure 3:
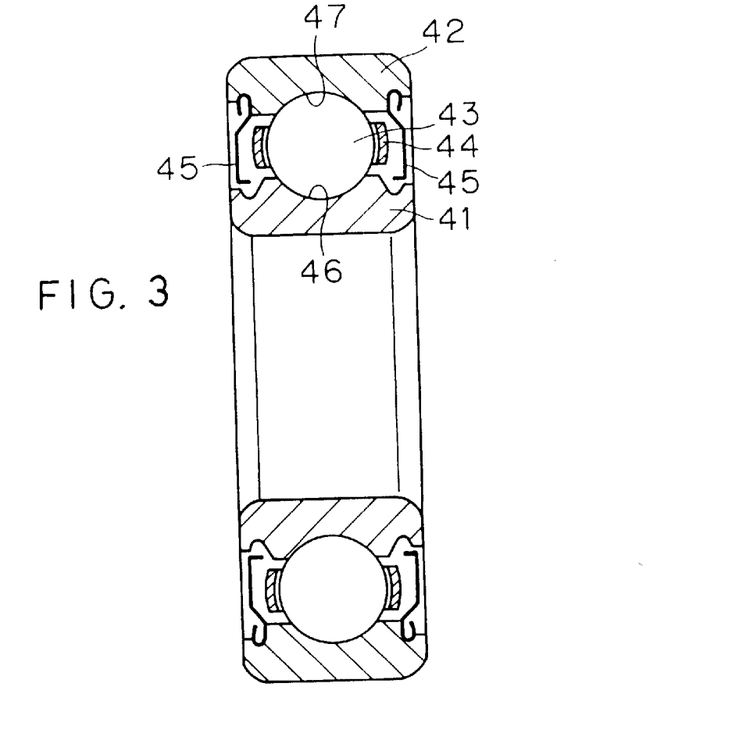
FIG. 3 is a longitudinal sectional view of a bearing which is an exemplary component to be machined.

FIG. 3 illustrates an example of the rolling bearing including the previously discussed work W. The illustrated rolling bearing comprises an inner race 41, an outer race 42, a plurality of rolling elements 43 such as, for example, steel balls retained by a retainer 44 and interposed between the inner and outer races 41 and 42, and annular seals 45 secured to the outer race 42. The inner and outer races 41 and 42 which serve as respective track rings are formed with associated race grooves 46 and 47 each being of a substantially arcuate crosssec-tional shape. In the description of the present invention, the inner race 41 is referred to as the work W to be machined by the machine tool 3 comprised of the grinding machine shown in FIG. 2.

The operation of the race groove machining system according to the first embodiment of the present invention will now be described. The machine tool 3 performs a machining operation on the work W under the control of the control means 4. The information storage device 7 stores the various preset conditions necessary to perform the machining operation on the work W. By way of example, the various conditions associated with the machining work includes the rotational speed of the grindstone, the machining feed speed, the machining feed rate, dressing condition for dressing the rotary grindstone 27, the rotational speed of the main shaft 22 (or the work W) and so on. Conditions (product conditions) associated with the work W which is the component part to be processed includes the product identification, weight, groove dimensions, grinding width, specific heat, coefficient of thermal expansion and so on. Also, the information necessary to supervise the machining process includes the machining power, dimensions of the product being machined, machining temperature and machining time and so on. The information on those conditions are transmitted by the information processing means 11 adjacent the independent machining apparatus 1 to the control means 4 according to the work W to be machined. The information to be transmitted by the information processing means 11 to the control means 4 is given from the remote information processing means 10 through the communication line 12.

On the other hand, in the machine tool 3, not only are change in machining power and dimension of the work W, the machining temperature and the machining time detected by the status detecting means 5, but also the preset information (rotational speed and feed rate) in the information storage device 7 appropriate to the machining conditions is read out. These acquired information is not only utilized by the control means 4 for the control of the machining operation, but also transmitted to the information processing means 11 adjacent the control means 4 and to the remote information processing means 10 through the communication line 12.

For the reason described above, the work W having a stabilized size can be manufactured by monitoring acquisition signals from the acquisition means 8 of the independent machining apparatus 1 by a remote control with no need for the attendant worker to visit to the distant site. Also, comprehension of change of the machine tool 3 with passage of time can be accomplished simply and instruction on maintenance of component part can assuredly be issued. In addition, the history of the machining information by the individual machine tools 3 can be accumulated, analyzed and managed all at a time by means of the distant information processing means 10. For this reason, the machining accuracy can be increased at less cost of equipment investment and the supervision of the equipment can be efficiently performed. In the case of the production of bearings, it is often that a number of independent machining apparatuses 1 of the same kind are installed, and therefore, the capability of collectively changing the machining conditions and the control conditions set in the control means 4 of each of those independent machining apparatuses 1 can work effectively.

Where the machine tool 3 is the grinding machine as shown in FIG. 2, the information stored in the information storage device 7 of the control means 4 or detected by the status detecting means 5 are specifically as follows:

Of the machining condition information, the information associated with the grindstone includes that on rapid feed rate, rapid feed speed, back-off quantity, back-off speed, coarse feed rate, coarse feed speed, fine feed rate, fine feed speed, fine feed stabilization time, initial size of the grindstone, grindstone replacement size, offset, main shaft rotational speed, grindstone rotational speed and so on.

Of the machining condition information, the information associated with dressing includes that on correction amount for dressing, radius of swivel of the dresser, dresser position correction amount, dressing speed, dress skip and so on.

The machining condition information includes information on machining power, machining dimension, machining temperature and machining period.

The product shape and accuracy information includes that on product groove diameter, product grinding width, product width, product specific heat, coefficient of thermal expansion of the product and product identification.

In describing the foregoing embodiment of the present invention, the work W has been assumed to be the inner race 41 (FIG. 3) of the rolling bearing. However, the component part to be machined by the race groove machining system may be the outer race 42 (FIG. 3) of the rolling bearing, an inner race 51 or an outer race 52 of a constant velocity flexible coupling such as shown in FIG. 4, or a screw shaft or a nut of a ball screw.

Figure 4:
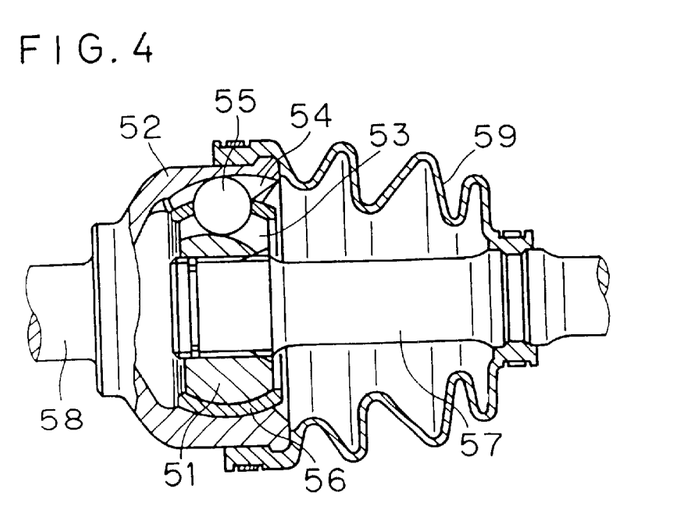
FIG. 4 is a longitudinal sectional view of a constant velocity flexible coupling which is another exemplary component to be machined.

The constant velocity flexible coupling shown in FIG. 4 comprises the inner race 51 having race grooves 53 formed therein, the outer race 52 having race grooves 54 formed therein, and a plurality of rolling elements 55 such as steel balls sandwiched between the inner and outer races 51 and 52 while accommodated in part in the race groove 53 and in part in the race groove 54. The rolling elements 55 are retained in position having been accommodated in respective pockets defined in a retainer 56. The inner race 51 is a component part having a shaft 57 fitted thereto. The race grooves 53 are formed on the outer peripheral surface of the inner race 51 so as to extend in a direction axially thereof with their groove bottom lines extending arcuately in the axial direction. On the other hand, the outer race 52 is in the form of a cup-like component part having the shaft 58 formed integrally therewith. The race grooves 54 are formed on the inner peripheral surface of the outer race 52 so as to extend axially thereof with their groove bottom lines extending arcuately in the axial direction. The outer race 52 has an opening enclosed by a flexible tubular boot 59 made of, for example, rubber and connected at one end to an outer peripheral portion of the outer race 52 adjacent the opening thereof and at the opposite end to the shaft 57 fitted to the inner race 51.

Figure 5:
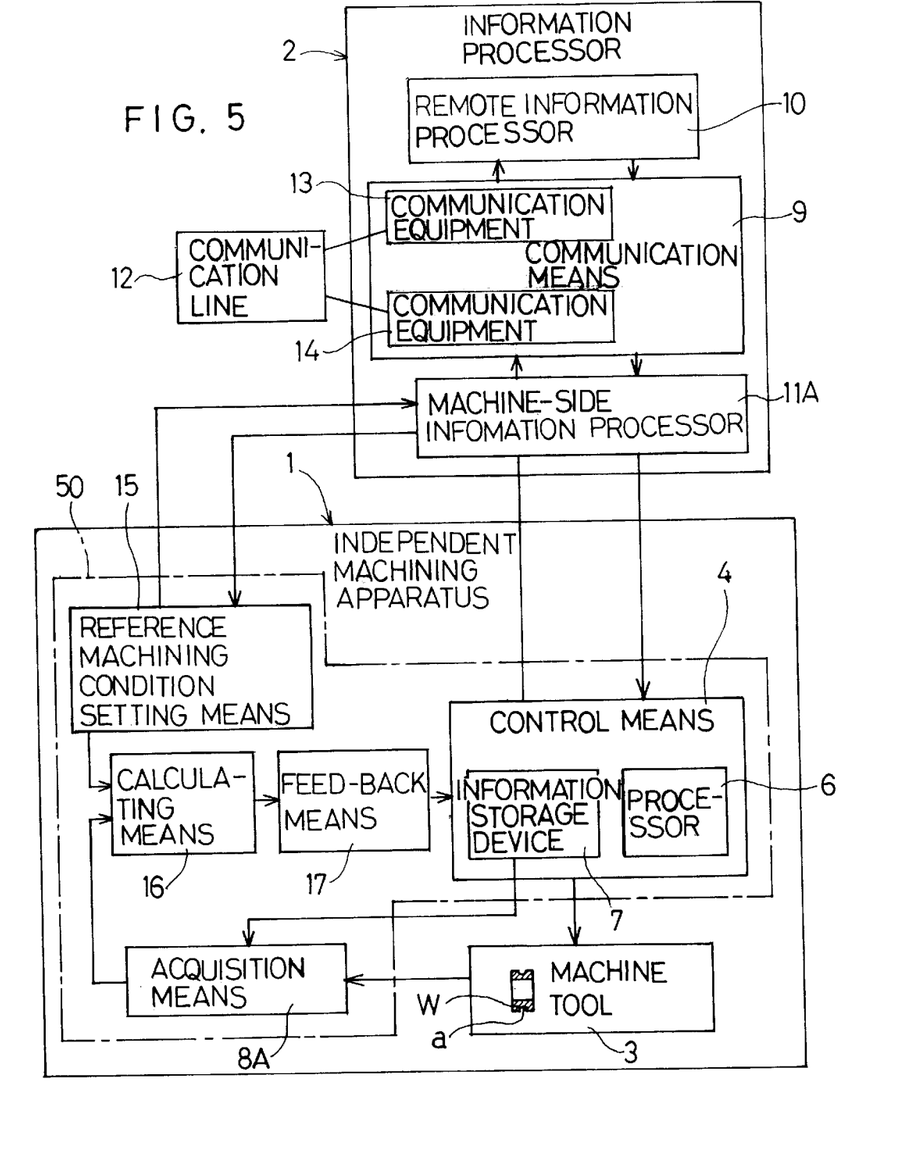
FIG. 5 is a block diagram showing a schematic structure of a race groove machining system according to a second preferred embodiment of the present invention.

Referring now to FIG. 5, there is shown a block diagram of the race groove machining system according to a second preferred embodiment of the present invention. As is the case with the race groove machining system according to the foregoing embodiment, the race groove machining system according to this embodiment generally comprises an independent machining apparatus 1 and an information processing apparatus 2. The independent machining apparatus 1 includes mainly a machine tool 3 and a control device 50. However, the independent machining apparatus 1 also includes an acquisition means 8A for acquiring information associated with the machining operation. The control device 50 includes a control means 4, a setting means 15 for setting reference machining conditions, the acquisition means 8A for acquiring the information associated with the machining operation, a calculating means 16 and a feed-back means 17.

The control device 50 comprises, for example, a computer-assisted numerically controlled machine (CNC machine), a programmable controller (PC device) and a control panel (not shown) therefor. Of the component part of the control device 50, a means for controlling the machine tool 3 is constituted by the control means 4. This control means 4 includes an information storage device 7 for storing various preset information and detected information both necessitated for particular machining operations and a processing device 6 for executing a selected one of the particular machining operations according to contents stored in the information storage unit 7, feed-back information of the feed-back means 17 and a machining program.

The setting means 15 for setting the reference machining conditions is used to set various reference conditions associated with the machining operation. For example, the machining condition may include the rotational speed of a tool, the tool feed speed, the tool feed rate, a dressing condition for a grindstone in the case of a grinding machine, the rotational speed of a main shaft (or the rotational speed of the work), and so on. Also, conditions for the work to be machined (product conditions) may include, for example, product identification, weight and groove dimensions, grinding width, specific heat, coefficient of thermal expansion, dimensional precision of various parts and so on. In addition, information necessary to supervise the machining process may include, for example, machining power, dimensions of the product being machined, machining temperature, machining time and so on.

The acquisition means 8A is a term used to collectively denote various sensors used to detect information concerning machining conditions at various localities in the machine tool 3 and means for reading predetermined contents stored in the information storage device 7 in the control means 4. It is, however, to be noted that this acquisition means 8A may not include the means for reading the contents stored in the information storage device 7, in which case the acquisition means 8A is a term used to collectively denote the various sensors of the machine tool 3 only.

The calculating means 16 is a means for comparing information concerning the machining operation acquired by the acquisition means 8A with the reference machining conditions set by the setting means 15 and then calculating the difference therebetween.

The feed-back means 17 is a means for transmitting information on the difference calculated by the calculating means 16 to the control means 4 as feed-back information.

The information processing apparatus 2 employed in the practice of the second embodiment of the present invention is substantially similar to the information processing apparatus 2 employed in the first embodiment, except that in place of the information processing means 11 adjacent the control means, a machine-side information processing means 11A adjacent the machining apparatus is used.

The machine-side information processing means 11A is a means for bidirectionally transmitting information between both the control means 4 and the setting means 15 and the remote information processing means 10 and may be employed in the form of a personal computer or the like.

Figure 6:
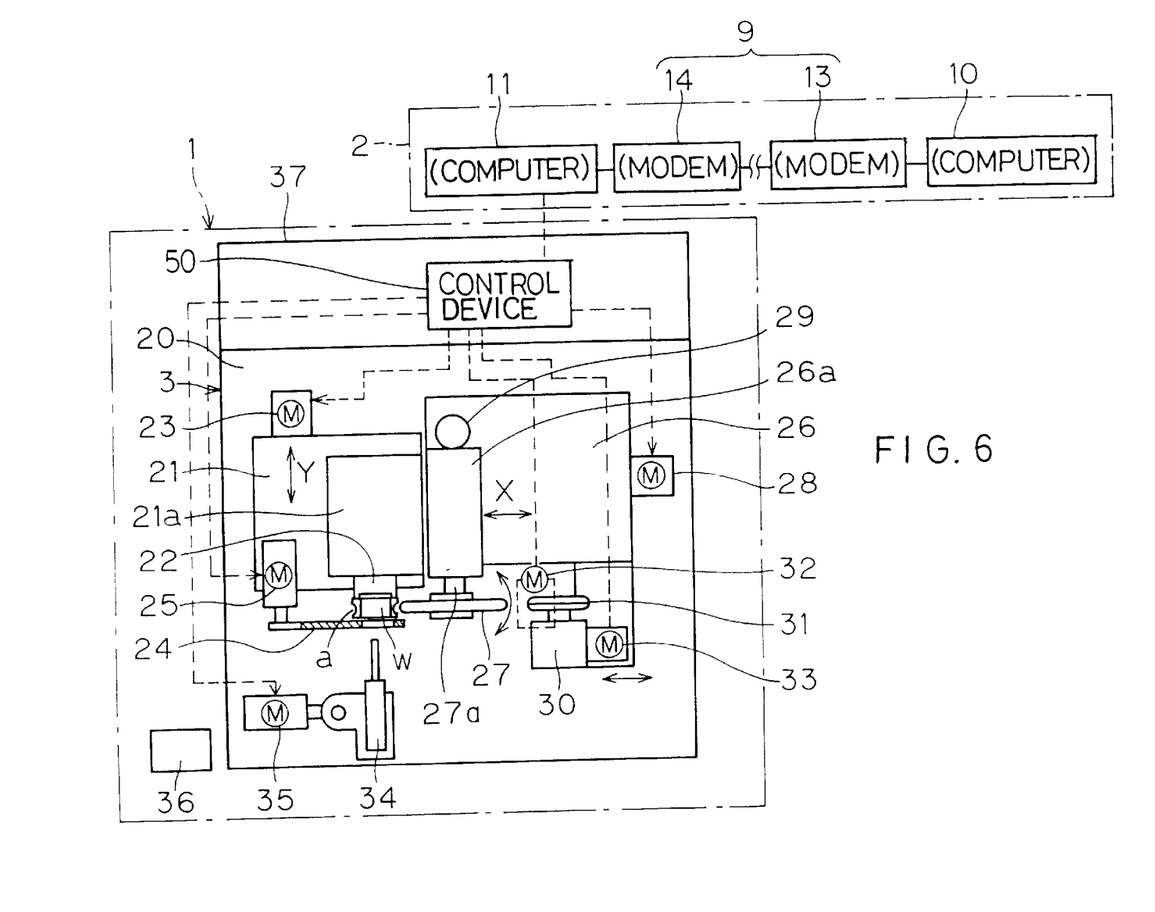
FIG. 6 is a diagram showing a schematic plan view of a machine tool of the race groove machining system shown in FIG. 5, together with its block diagram.

FIG. 6 illustrates a specific structure of the independent machining apparatus 1 shown in FIG. 5. This independent machining apparatus 1 shown in FIG. 6 is substantially similar to that shown in FIG. 2, except for the following differences. More specifically, the independent machining apparatus 1 used in the practice of the second embodiment of the present invention makes use of a control device 37 which is disposed adjacent the machine tool 3, and a portion or the whole of the control device 37 forms the control device 50 comprised of the previously described CNC machine.

The gauge device 34 and the power detector 29 form respective parts of the acquisition means 8A shown in FIG. 5.

The operation of the race groove machining system according to the second embodiment of the present invention will now be described. The machine tool 3 performs a machining operation on the work W under the control of the control means 4. The setting means 15 stores the various reference conditions necessary to perform the machining operation on the work W. By way of example, the various conditions associated with the machining work includes those associated with the rotational speed of the grindstone, those associated with the product identification, and information necessary to supervise the machining condition such as the machining power. The information on those conditions is set to the setting means 15 from the remote information processing means 10 through the communication line 12 and the machine-side information processing means 11A and is occasionally updated. It is to be noted that the range of products set in the setting means 15 is a predetermined quantity, for example, that of products highly likely to be machined by the independent machining apparatus 1, and the various reference conditions associated with those products are set in the setting means 15. In the event that a product which is not set in the setting means 15 is brought in a machining line including the independent machining apparatus 1, reference conditions associated with such product are set to the setting means 15 from the remote information processing means 10.

Once the product to be machined is selected by the control device 50 of the independent machining apparatus 1 or the remote information processing means 10, some of the reference machining conditions set in the setting means 15, which are appropriate to the selected product, are captured by the control means 4 through the machine-side information processing means 11A, wherefore the machining operation is carried out under the control of the control means 4 according to the captured reference conditions. The information captured by the control means 4 is stored in the information storage device 7.

On the other hand, in the machine tool 3, not only are change in machining power and dimension of the work W, the machining temperature and the machining time detected by the acquisition means 8A, but also the information (rotational speed and feed rate) appropriate to the machining conditions is read by the acquisition means 8A. Acquisition of the information appropriate to the machining conditions is carried out by reading the contents stored in the information storage device 7 of the control means 4.

These detected and read informations are sequentially compared with the reference machining conditions (reference machining conditions appropriate to the selected product) and the difference therebetween is calculated by the calculating means 16. Information on the difference calculated by the calculating means 16 is given as feed-back information to the control means 4 by the feed-back means 17, and the control means 4 makes use of this feed-back information to control the machining operation performed by the machine tool 3. Simultaneously therewith, the feed-back information is transmitted from the control means 4 to the remote information processing means 10 through the machine-side information processing means 11.

Where the machine tool 3 is the grinding machine as shown in FIG. 6, the reference machining conditions set by the condition setting means 15 and the information acquired by the acquisition means 8A are specifically as follows:

Of the machining condition information, the information associated with the grindstone includes that on rapid feed rate, rapid feed speed, back-off quantity back-off speed, coarse feed rate, coarse feed speed, fine feed rate, fine feed speed, fine feed stabilization time, initial size of the grindstone, grindstone replacement size, offset, main shaft rotational speed, grindstone rotational speed and so on.

Of the machining condition information, the information associated with dressing includes that on correction amount for dressing, radius of swivel of the dresser, dresser position correction amount, dressing speed, dress skip and so on.

The machining condition information includes information on machining power, machining dimension, machining temperature and machining period.

The product shape and accuracy information includes that on product groove diameter, product grinding width, product width, product specific heat, coefficient of thermal expansion of the product and product identification.

Even with the second embodiment of the present invention, as is the case with the previously described first embodiment, increase of the machining accuracy at a less cost of investment on equipments can be achieved along with efficient maintenance of the equipments.

Although in the foregoing embodiments, the independent machining apparatus 1 has been described in connection with the grinding machine, the independent machining apparatus 1 may be a lather turning machine. Also, the independent machining apparatus 1 comprised of the grinding machine and the independent machining apparatus 1 comprised of the lather turning machine may have common remote information processing means 10 connected with each other through the communication means 9 and the control-side or machine-side information processing means 11 or 11A.

Figure 7:
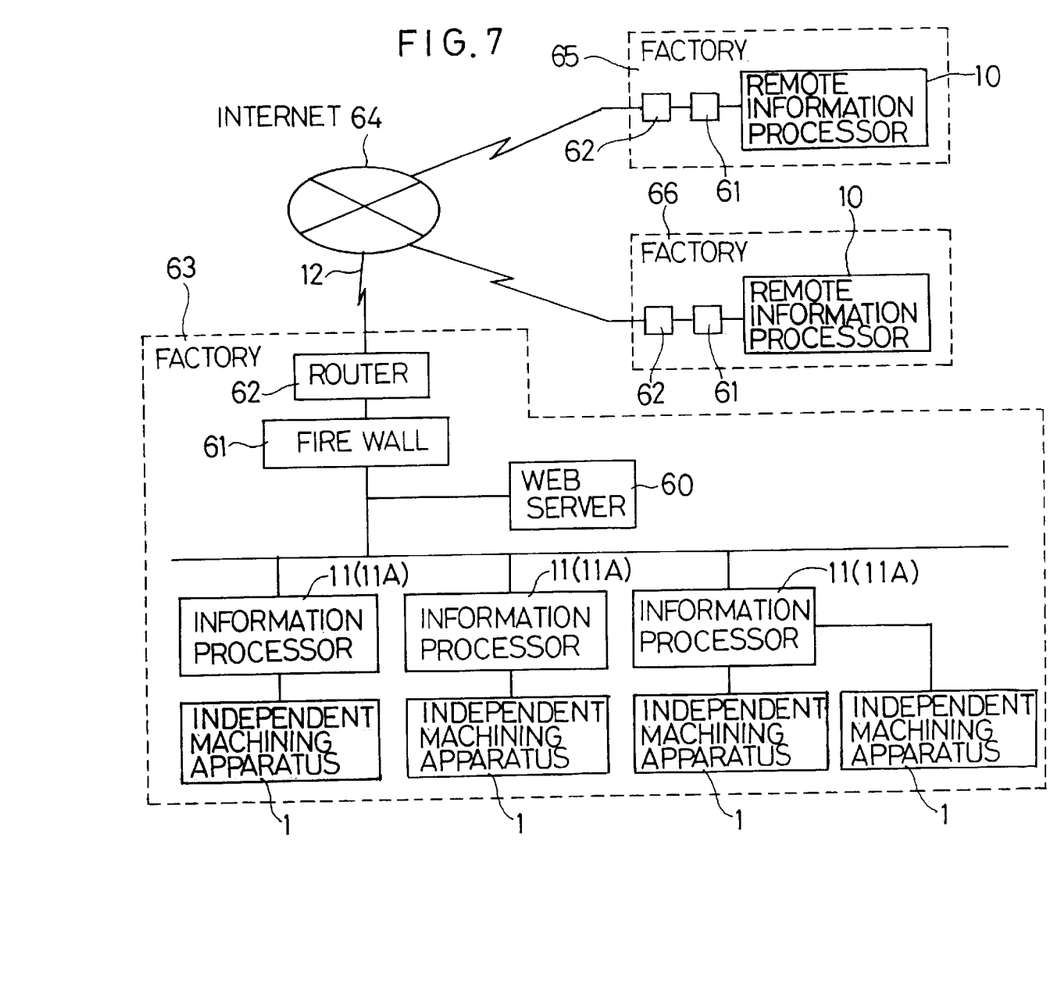
FIG. 7 is a block diagram showing a communication network system for the race groove machining system of the present invention.

FIG. 7 illustrates a communication system employed in connection with the race groove machining system of the structure shown in and with reference to any one of FIGS. 1 and 5. A plurality of independent machining apparatuses 1 installed in a predetermined factory 63 are singly or in combination connected with common information processing means 11 or 11A which form a local area network together with a web server 60, a fire wall 61 and a router 62. This local area network is connected with remote information processing means 10 placed in a local area network established in individual plants 65 and 66.

Although the present invention has been filly described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A system for machining a component part having a race groove along which ball elements run, said system comprising:
    a machine tool for performing a machining operation on the component part having the race groove;
    an acquisition means for acquiring information related to the machining operation;
    a control means for controlling the machine tool based on the information acquired by the acquisition means;
    a remote information processing means installed at a site remote from the control means; and
    a communication means for connecting the control means and the remote information processing means through a communication line;
    said remote information processing means having a capability of acquiring the information, acquired by the acquisition means, through the control means and the communication line and transmitting the information to the control means; and
    wherein the information related to the machining operation includes information descriptive of a machining status and wherein the acquisition means includes a machining detecting means comprised of a plurality of sensors for detecting statuses of the machining operation.

2. The race groove machining system as claimed in claim 1, further comprising an additional information processing means intervening between the control means and the communication means and independent from the remote information processing means, said remote information processing means delivering the information with the control means through the additional information processing means.

3. The race groove machining system as claimed in claim 1, wherein the information related to the machining operation includes machining conditions stored in a machining condition storage device, said acquisition means having its acquiring capability of reading the information stored in the machining condition storage device.

4. The race groove machining system as claimed in claim 1, wherein the information related to the machining operation includes a product information, which is information descriptive of a product shape and an precision, stored in a product information storage device, said acquisition means having its acquiring capability of reading the product information stored in the product information storage device.

5. The race groove machining system as claimed in claim 1, wherein the component part is that of a bearing or a constant velocity flexible coupling.

6. The race groove machining system as claimed in claim 1, wherein the machine tool is a grinding machine.

7. The race groove machining system as claimed in claim 1, wherein the machine tool is a lather turning machine.

8. A method of machining a component part having a race groove along which ball elements run, said method comprising the steps of:
    transmitting information related to a machining operation and acquired from an acquisition means that is provided in a machine tool or a control means for controlling the machine tool, to a remote information processing means remote from the control means through a communication line;

supplying to the controlling means information generated by the remote information processing means on the basis of the transmitted information;

controlling the machine tool by means of the control means that utilizes the supplied information; and machining the component part having the race groove by means of the machine tool to form a race groove in the component part;

wherein the information related to the machining operation includes information descriptive of a machining status and wherein the acquisition means includes a machining detecting means comprised of a plurality of sensors for detecting statuses of the machining operation.

9. A system for machining a component part having a race groove along which ball elements run, said system comprising:

a machine tool for performing a machining operation on the component part having the race groove;

a control means for controlling the machine tool;

an acquisition means for acquiring information related to the machining operation;

a setting means for setting reference machining conditions;

a calculating means for calculating a difference between the reference machining conditions and the information acquired by the acquisition means;

a feed-back means for supplying a result of calculation, performed by the calculating means, to the control means as feed-back information;

a remote information processing means installed at a site remote from the control means; and a communication means for connecting both the control means and the setting means with the remote information processing means through a communication line;

wherein said control means utilizing the feed-back information for controlling the machine tool, and said remote information processing means having a capability of acquiring the feed-back information through the control means and the communication line and transmitting information to the control means and the setting means.

10. The race groove machining system as claimed in claim 9, further comprising a machine-side information processing means intervening between both of the control means and the setting means and the communication means and independent from the remote information processing means, said remote information processing means delivering the information with the control means and the setting means through the machine-side information processing means.

11. The race groove machining system as claimed in claim 9, wherein the reference machining conditions and the information related to the machining operation, acquired by the acquisition means, includes machining conditions.

12. The race groove machining system as claimed in claim 9, wherein the reference machining conditions and the information related to the machining operation, acquired by the acquisition means, includes information descriptive of the product and the precision thereof.

13. The race groove machining system as claimed in claim 9, wherein the reference machining conditions and the information related to the machining operation, acquired by the acquisition means, includes information descriptive of a machining status.

14. The race groove machining system as claimed in claim 9, wherein the component part is that of a bearing or a constant velocity flexible coupling.

15. The race groove machining system as claimed in claim 9, wherein the machine tool is a grinding machine.

16. The race groove machining system as claimed in claim 9,wherein the machine tool is a lather turning machine.

17. A method of machining a component part having a race groove along which ball elements run, with the use of a machine tool under the control of a control means, said method comprising the steps of setting reference machining conditions in a setting means;

acquiring information related to a machining operation from the machine tool machining the component part having the race groove and the control means by an acquisition means;

calculating a difference between the reference machining condition, set in the setting means, and the information acquired by the acquisition means, by means of a calculating means;

supplying a result of calculation, performed by the calculating means, to the control means as feed-back information, said control means utilizing the feedback information for the control and to transmit the feedback information to a remote information processing means that is installed at a site remote from the control means and connected with the control means through a communication line;

supplying to the control means and the setting means information generated by the remote information processing means on the basis of the transmitted information;

controlling the machine tool by means of the control means that utilizes the supplied information; and updating contents of the reference processing conditions set in the setting means.

* * * * *